(12) United States Patent
Norris

(10) Patent No.: US 10,082,238 B1
(45) Date of Patent: *Sep. 25, 2018

(54) JACK STAND CONSTRUCTION

(71) Applicant: Ronald M. Norris, Norton, VA (US)

(72) Inventor: Ronald M. Norris, Norton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/330,641

(22) Filed: Oct. 21, 2016

Related U.S. Application Data

(63) Continuation-in-part of application No. 14/545,948, filed on Jul. 10, 2015.

(60) Provisional application No. 61/999,178, filed on Jul. 17, 2014.

(51) Int. Cl.
*F16M 11/22* (2006.01)
*B66F 13/00* (2006.01)
*B66F 3/24* (2006.01)

(52) U.S. Cl.
CPC ............... *F16M 11/22* (2013.01); *B66F 3/24* (2013.01); *B66F 13/00* (2013.01)

(58) Field of Classification Search
CPC .... B66F 13/00; B66F 3/24; B66F 3/25; B66F 3/30; B66F 3/3242; F16M 11/22
USPC ........... 280/763.1, 765.1, 766.1; 248/346.01, 248/346.03, 346.05, 352, 357, 676, 188.1, 248/188.2, 188.3, 188.4, 188.8; 254/93 R, 89 H, 2 B; 5/509.1; 52/123.1, 52/111, 115, 118, 126.6
See application file for complete search history.

(56) References Cited

U.S. PATENT DOCUMENTS

| 2,524,955 | A | * | 10/1950 | Borzell | F16M 11/22 |
| | | | | | 206/509 |
| 3,837,752 | A | * | 9/1974 | Shewchuk | F21V 21/06 |
| | | | | | 248/158 |
| 4,295,308 | A | * | 10/1981 | Korfanta | E04H 12/2261 |
| | | | | | 248/158 |
| 4,574,709 | A | * | 3/1986 | Lackey | A47B 87/0223 |
| | | | | | 108/11 |
| 4,674,907 | A | * | 6/1987 | Shewchuk | F21V 21/10 |
| | | | | | 403/2 |
| 4,850,658 | A | * | 7/1989 | Sandor | A47F 5/02 |
| | | | | | 211/163 |
| 5,205,097 | A | * | 4/1993 | Harvey | E02D 27/02 |
| | | | | | 248/188.2 |
| 5,720,524 | A | * | 2/1998 | Hall | A47C 3/18 |
| | | | | | 108/65 |
| 6,012,185 | A | * | 1/2000 | Woods | A47C 19/024 |
| | | | | | 248/188.2 |
| 6,363,685 | B1 | * | 4/2002 | Kugler | E04F 15/02183 |
| | | | | | 52/126.6 |

(Continued)

OTHER PUBLICATIONS

"Google Definition of Jack", Google, last accessed Apr. 5, 2017, https://www.google.com/search?q=define+jack&oq=define+jack&aqs=chrome..69i57j0l5.2167j0j8&sourceid=chrome&ie=UTF-8.*

(Continued)

*Primary Examiner* — Jonathan Liu
*Assistant Examiner* — Guang H Guan

(57) ABSTRACT

A steel stand for supporting heavy structures such as road construction and excavating equipment, either with or without a jacking device, wherein the stand has a central tubular steel core member, wherein ends of the core member are welded to parallel steel plates, and, wherein the stand has a perimetrically positioned plurality of steel, vertical side members spaced substantially circumferentially around the plates.

4 Claims, 4 Drawing Sheets

(56) References Cited

U.S. PATENT DOCUMENTS

| | | | | |
|---|---|---|---|---|
| 6,439,543 B1* | 8/2002 | Peckham | ................ | B66F 7/243 188/32 |
| 6,464,192 B1* | 10/2002 | Gibbs, Jr. | ................ | B66F 1/025 248/352 |
| 7,302,778 B2* | 12/2007 | MacMillan | ......... | E04H 12/2269 52/169.9 |
| D649,434 S * | 11/2011 | Lalancette | ................ | D8/354 |
| 8,235,346 B2* | 8/2012 | Bakos | ................ | E04H 12/2261 248/354.1 |
| 8,464,482 B2* | 6/2013 | Raynor | ................ | E04C 3/34 52/169.9 |
| 9,033,293 B1* | 5/2015 | Glenn | ................ | A47B 91/005 248/188.2 |
| 2002/0078638 A1* | 6/2002 | Huang | ................ | E04B 5/10 52/126.6 |
| 2009/0072525 A1* | 3/2009 | Banks | ................ | B66C 23/78 280/763.1 |

OTHER PUBLICATIONS

"Dictionary Definition of Along", The Free Dictionary, last accessed Apr. 5, 2017, http://www.thefreedictionary.com/along.*

* cited by examiner

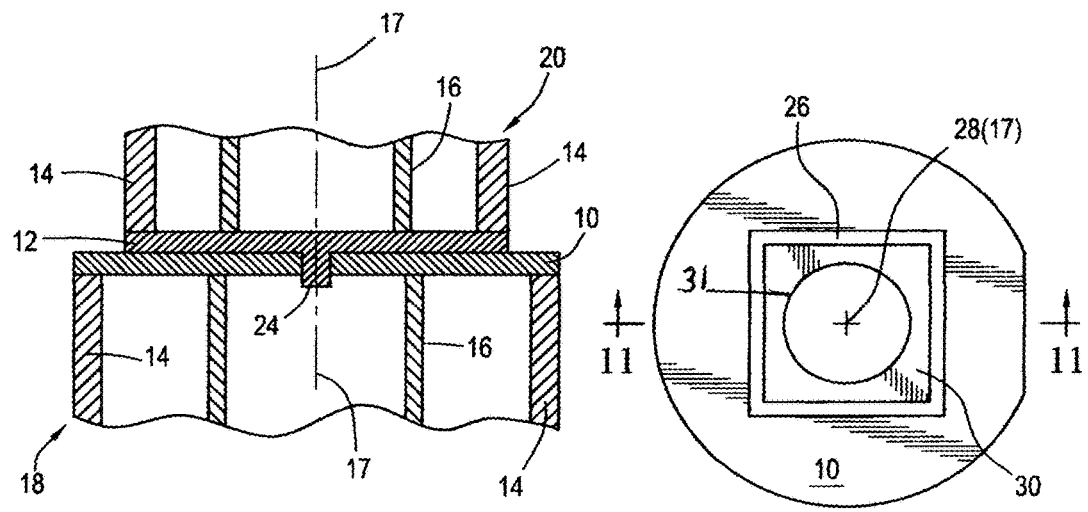
FIG. 8
FIG. 10
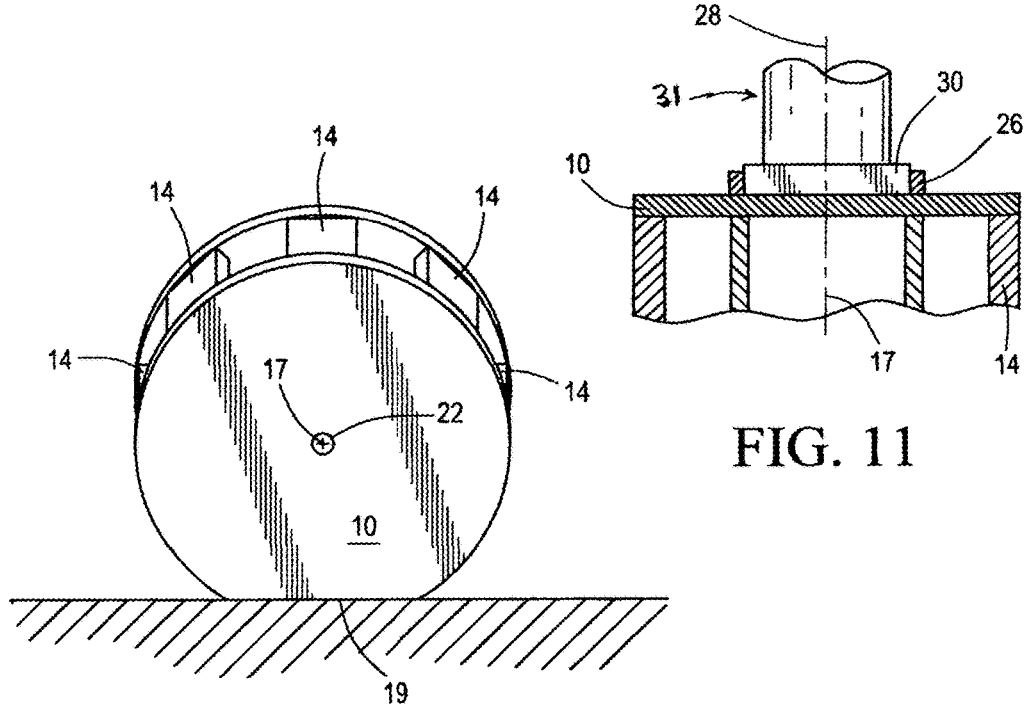
FIG. 9
FIG. 11

JACK STAND CONSTRUCTION

This application is a Continuation-in-Part application of Ser. No. 14/545,948, filed Jul. 10, 2015 and claims priority under 35 U.S.C. 119(e)(1) based on said Ser. No. 14/545,948 and on Applicant's Provisional U.S. Patent Application Ser. No. 61/999,178 filed Jul. 17, 2014, titled "JACK STAND CONSTRUCTION".

BACKGROUND OF THE INVENTION

This invention is in the field of jack stands and is particularly directed to such stands which are to be used for supporting hydraulic jacks for lifting extraordinary weights, or for supporting such weights per se, e.g. 100 tons or more such as is required for supporting large excavating and earth moving equipment for repairing or replacing their tracks, wheels, tires or other underneath structures. The present construction of the stands is designed to be built in a size and strength to readily surpass the rigid governmentally required construction, structural weight and safety codes for their intended use.

PRIOR ART

Prior to applicant's invention, stands used for supporting heavy loads such as road construction equipment have varied widely in their constructions, for example from piles of used tires to stacks of railroad ties and everything in between. For example, in 2012, a man was killed attempting to change a tire on a 789 Cat Hauler Truck. At the time, the procedure was to stack 6×6 crib blocks to a height of 3 feet, then place a 100-ton bottle jack on top of the crib stack. The crib stack collapsed, causing the man's death under the weight of the truck. As such, compliance with Federal and/or State safety codes have rarely been a major consideration, unfortunately, for workers who have been in a hurry for getting on with their work. The present invention offers a standard line of stands which are all designed for supporting prescribed weights per se, or jacking devices according to all regulations, whereby guessing whether a makeshift stand will safely support the—off times—enormous weight.

SUMMARY OF THE INVENTION

The present invention is in a heavy duty stand structure per se or used in combination with a jacking device, wherein the stand structure is configured with top and bottom flat steel plates which are welded at their center portions to the ends of a vertical steel central tube member, and wherein steel vertical side members are welded at their ends to and between perimetric portions of the plates radially spaced from the tube member in spaced array around the perimeter of the plates.

The present stands are built to be used in many types of environments such as mining, construction and heavy equipment dealers, and equipment repair features can be customized for specific needs. The jack stands with attachments work great for supporting dozer blade push arms, equipment counter weights and, with the large cradled attachment, work great for supporting continuous miner heads.

Applicant's stands have been tested and certified to double their advertised capacity by Clisso's Engineering Service. They have also been tested in the field extensively. The stands meet OSHA and MSHA certification requirements. A typical base stand is 20" wide by 20" tall and the top stand is 16" wide by 16" tall. The stands pin together (locate) for safety but can be used individually.

BRIEF DESCRIPTION OF THE DRAWINGS

The present invention will be further explained through the drawings herein and their descriptions wherein:

FIG. 8 is a cross-sectional view of contiguous upper and lower end portions of a stacked set of base stand and top stand and showing the centering (locator) safety pin in operative position;

FIG. 9 is a perspective view of the stand on its side on the ground with its anti-roll shoulder in position on the ground;

FIG. 10 is a top view of the top plate having a jack locator and axial centering shoulder means;

FIG. 11 is a cross-sectional view taken along line 11-11 in FIG. 10;

DETAILED DESCRIPTION

Figure 1:
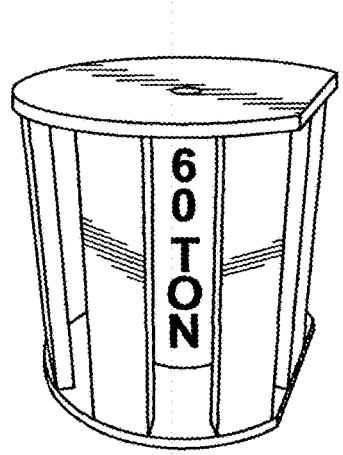
FIGS. 1 and 2 are perspective views of a stand with descriptions thereof.
Figure 2:
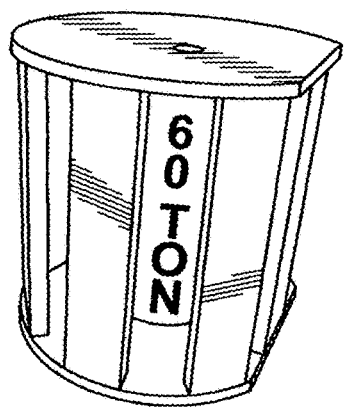
Figure 3:
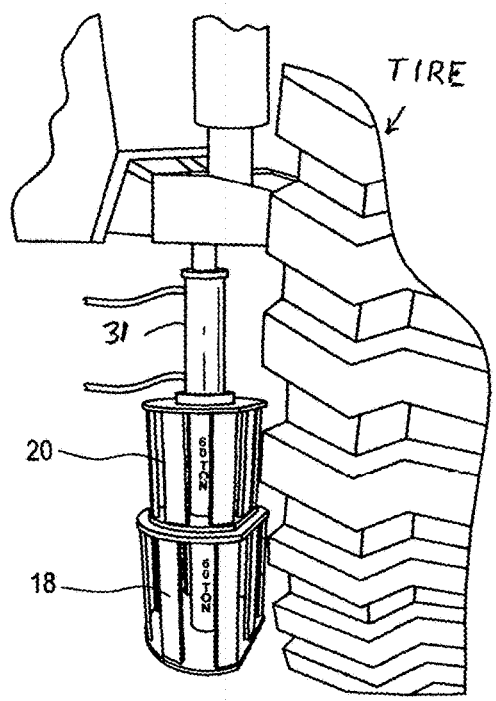
FIG. 3 is a view of the stands in a stacked set, i.e., base and top stands in position under a very heavy hauler machine, and supporting a large capacity hydraulic jack.
Figure 4:
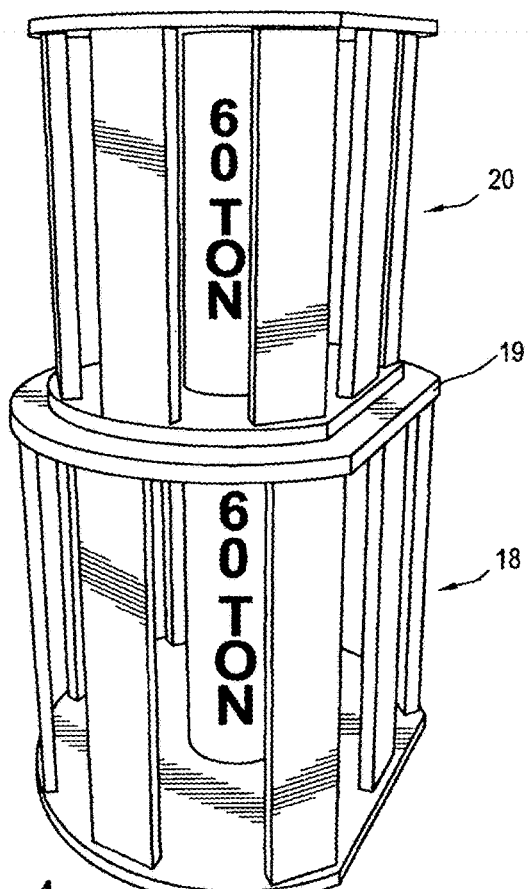
FIG. 4 is an enlarged perspective view of a stacked set of stands.
Figure 5:
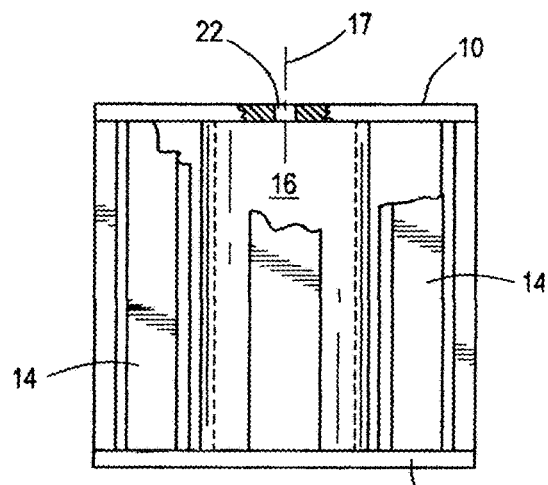
FIG. 5 is a front view (with portions broken away) of the stand taken along line 5 in FIG. 7.
Figure 6:
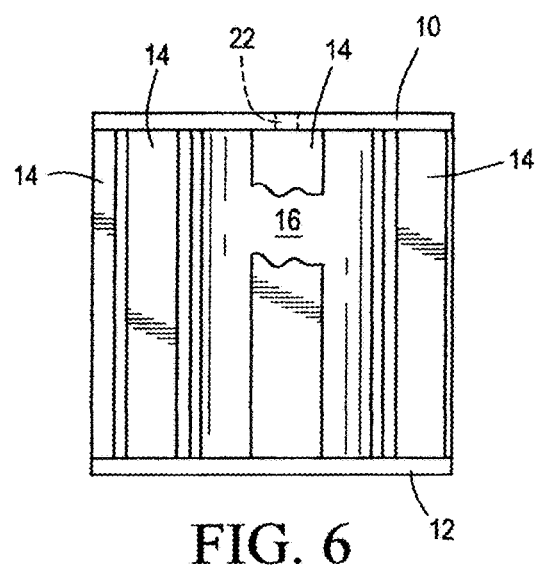
FIG. 6 is a side view of (with portions broken away) of the stand taken along line 7 in FIG. 7.
Figure 7:
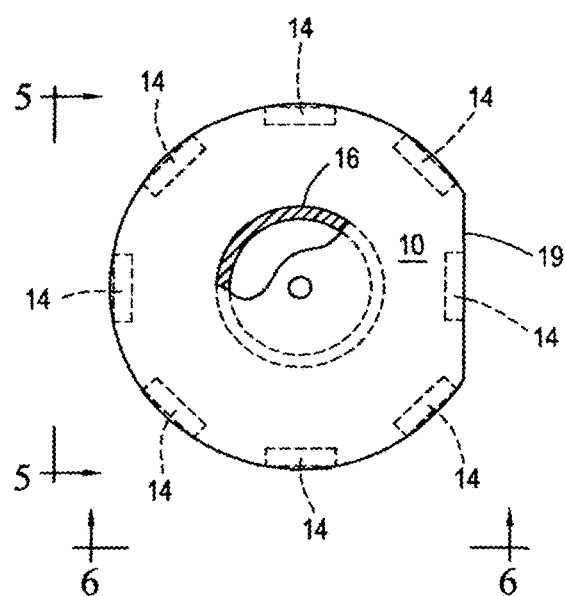
FIG. 7 is a top view (with portions broken away) of the stand.
Figure 12:
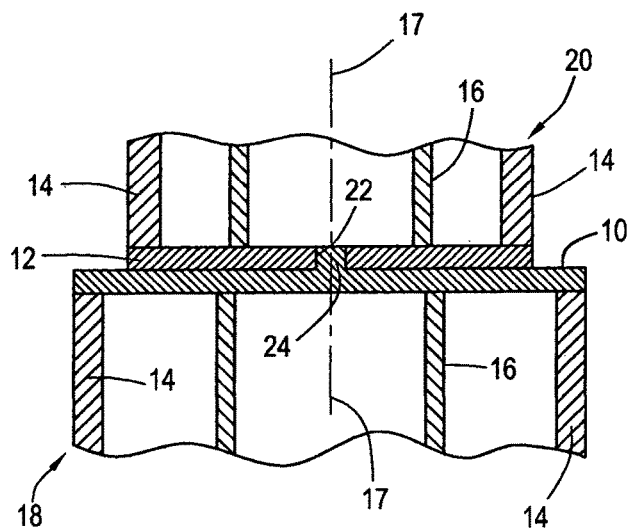
FIG. 12 is a cross-sectional view of a top jack support stand stacked on top of a bottom jack support stand wherein the alignment pin is affixed to the top plate of the bottom stand and the alignment aperture is formed through the bottom plate of the top stand.
Figure 13:
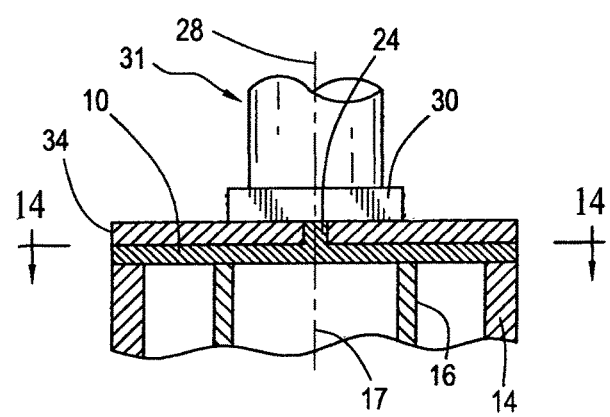
FIG. 13 is a cross-sectional view of a top portion of a jack support stand wherein the alignment pin is integral with the top plate of the stand and wherein an adapter plate 34 is positioned on the top plate to accommodate the alignment pin and provide for a flat upper surface of the top plate for supporting a jack.
Figure 14:
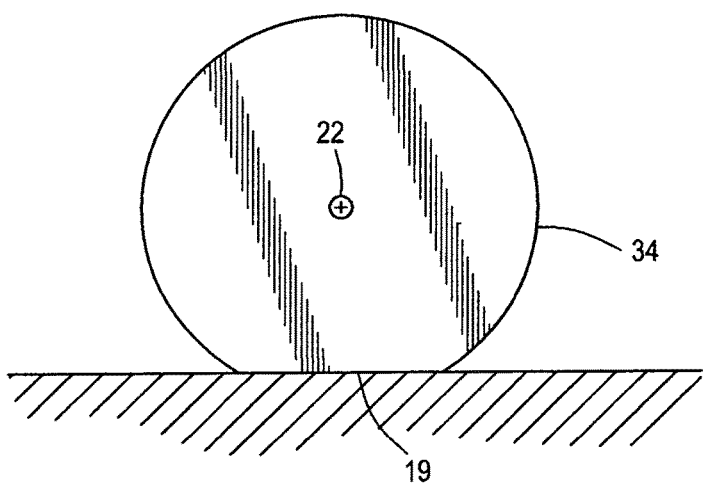
FIG. 14 is a top view of the adapter plate 34 of FIG. 13 taken along line 14-14 of FIG. 13.

Referring to the drawings, a summary of the stand construction comprises the welded assembly of a top plate 10, bottom plate 12, a plurality, e.g., 4-12, preferably 6-10 and most preferably eight, equally spaced side support bars 14, and a tubular center support post 16 having a longitudinal axis 17. A preferred set of dimensions for these steel components are given on the drawings. The set of base 18 and 20 stands (FIG. 8) can be of the same or different dimensions as long as good lateral stability and strength of the stand set are preserved. Either or both of 10 and 12 has an anti-roll edge portion (shoulder) 19. This shoulder is dimensioned to prevent accidental rolling of the stand while allowing the stand to be hand rolled into operative position. In a preferred embodiment of the stand set, a centering hole 22, preferably about 0.75 inches' diameter, is formed through the top end plate 10 of the base stand 18 on axis 17, and receives a centering or safety dowel pin 24 located on the bottom end plate 12 of the top stand 20, for lateral stability safety. The pin and hole can be reversed on the stand end plates if needed for a special purpose.

Referring to FIGS. 10 and 11, the top plate 10 is provided with indexing (locator) shoulder means 26 welded to 10 wherein longitudinal axis 17 is aligned with the piston axis 28 of a hydraulic jack 31. The configuration of the shoulder means 26 should be such as to snugly receive the base 30 of the jacking device.

The invention has been described in detail with particular reference to preferred embodiments thereof, but it will be understood that variations and modifications will be effected within the spirit and scope of the invention.

I claim:

1. A combination of an adaptor plate and a jack support stand for heavy weights,
    said jack support stand in an operating vertical posture comprising a vertically elongated steel center column, wherein said center column has a bottom end, a top end, a longitudinal axis, and a radially outer peripheral surface,
    said jack support stand further comprising a top plate and a bottom plate, wherein each plate has an upper planar surface, a lower planar surface, a substantially circular radially outer periphery, a substantially uniform thickness, and a center axis running through said upper and lower planar surfaces of each said plate,
    wherein said longitudinal axis of said center column is axially aligned with said center axis of each of said top and bottom plates,
    wherein said top end of said center column is welded to said lower planar surface of said top plate,
    wherein said bottom end of said center column is welded to said upper planar surface of said bottom plate,
    wherein all said upper and lower planar surfaces of said top and bottom plates lie in planes which are parallel to each other and which lie at right angles to said longitudinal axis of said center column,
    wherein a plurality of plate edge support members is provided and each being substantially straight and elongated and having a vertical axis, an upper end, and a lower end,
    wherein each said upper end is welded to said lower planar surface of said top plate at a location which is laterally spaced from said outer peripheral surface of said center column and which is adjacent said periphery of said top plate,
    wherein each said lower end is welded to said upper planar surface of said bottom plate at a location laterally spaced from said outer peripheral surface of said center column and adjacent said periphery of said bottom plate, wherein said locations of all said upper ends and said lower ends place each said plate edge support member in a vertical posture,
    wherein said plate edge support members are spaced from each other around the peripheries of said top and bottom plates and wherein said vertical axis of each said plate edge support member is parallel to said longitudinal axis of said center column,
    wherein all said plate edge support members have a same vertical length,
    wherein an anti-roll flat shoulder is formed in the periphery of at least one of said top and bottom plates,
    wherein a locator alignment pin is affixed to and protrudes from said top plate on said center axis of said top plate, and
    wherein said adaptor plate comprises a substantially disc shaped steel plate having a substantially circular perimetric edge, a top flat surfaced side and a bottom flat surfaced side parallel to said top flat surfaced side, wherein an alignment aperture is centrally located through said adaptor plate, wherein said alignment aperture has circumferential and axial length dimensions to allow a sliding fit of said alignment pin within said alignment aperture, wherein said pin has an axial dimension and said pin does not extend above said top flat surfaced side of said adaptor plate, wherein said bottom flat surfaced side of said adaptor plate directly lies flat on said upper planar surface of said top plate of said jack support stand.

2. The combination of claim 1 wherein said plurality of plate edge support members comprises eight plate edge support members which are substantially equally spaced from each other around the peripheries of said top and bottom plates.

3. A system comprising a jacking device and the combination of claim 1 wherein said jacking device is positioned in an operating posture on top of said adaptor plate.

4. The combination of claim 2 wherein each said plate edge support member is rectangular bar shaped in cross-section and is of solid steel.

* * * * *